(12) United States Patent
Komai

(10) Patent No.: US 7,154,701 B2
(45) Date of Patent: Dec. 26, 2006

(54) HEAD SUPPORT STRUCTURE

(75) Inventor: Hirokazu Komai, Odawara (JP)

(73) Assignee: Fuji Photo Film Co., Ltd., Kanagawa (JP)

(*) Notice: Subject to any disclaimer, the term of this patent is extended or adjusted under 35 U.S.C. 154(b) by 0 days.

(21) Appl. No.: 10/968,952

(22) Filed: Oct. 21, 2004

(65) Prior Publication Data
US 2005/0117261 A1 Jun. 2, 2005

(30) Foreign Application Priority Data
Nov. 28, 2003 (JP) .............................. 2003-399631

(51) Int. Cl.
G11B 5/584 (2006.01)
G11B 21/24 (2006.01)

(52) U.S. Cl. ...................... 360/77.12; 360/75; 360/291

(58) Field of Classification Search ............. 360/77.12
See application file for complete search history.

(56) References Cited

U.S. PATENT DOCUMENTS 5,003,717 A * 4/1991 Trame et al. .................. 40/518
6,075,678 A * 6/2000 Saliba ......................... 360/291
6,339,522 B1 * 1/2002 Hoelsaeter ................... 360/291

FOREIGN PATENT DOCUMENTS

JP 2001-93211 A 4/2004

* cited by examiner

Primary Examiner—Wayne Young
Assistant Examiner—Jason Olson
(74) Attorney, Agent, or Firm—Sughrue Mion, PLLC

(57) ABSTRACT

A head support structure of the present invention is the head support structure for recording/reproducing a servo signal on a magnetic tape, comprises a base portion and a support arm, which is one-side supported at the base portion and provides a head provided position-adjustably at a free end for the magnetic tape, and provides a support portion for supporting the free end of the support arm for the base portion.

26 Claims, 4 Drawing Sheets

HEAD SUPPORT STRUCTURE

BACKGROUND OF THE INVENTION

1. Field of the Invention

The present invention relates to a head support structure for recording/reproducing a servo signal on a tape-form recording medium (hereinafter referred to as magnetic tape).

2. Description of the Related Art

These years, in a magnetic tape used for a data backup and the like of a computer, an improvement of line density of further increasing the number of data tracks is intended in order to accurately read high-densely recorded data, and a technique of recording/reproducing servo signals on a plurality of servo bands neighboring these data tracks is adopted.

In a magnetic tape system for using such servo signals, it is necessary to accurately write (record) the servo signals on the magnetic tape, and as an apparatus therefor, a servo writer is used.

FIG. 6 is a drawing for illustrating a structure around a servo write head in a servo writer, and a servo write head 50 is attached to a free end 52a of a support arm 52 attached to a base portion 51 with directing a head face 50a toward a recording face of a magnetic tape MT. The support arm 52 is configured of precision components, and by a position adjustment means (not shown) for adjusting a position of the servo write head 50 for the magnetic tape MT, a position adjustment in a height direction and adjustments of a wrap angle, an azimuth angle, and an angle (made by a face of the tape MT with the head 50) are performed, whereby the servo signals are designed to be recorded on predetermined positions of the magnetic tape MT.

Meanwhile, in such a technical field something is also proposed that servo signals are designed to be recorded on predetermined positions by making a side of a servo write head a fixed structure, a side of a magnetic tape a position adjustable configuration, and performing a position adjustment of the side of the magnetic tape (see paragraphs 0009 to 0011 and FIG. 1 in Japanese Patent Laid-Open Publication No. 2001-93211).

As described above, it is necessary to perform the recording of the servo signals at accurate positions, for example, micron order, of the magnetic tape MT. However, in a servo writer, when actually running the magnetic tape MT and writing the servo signals with the servo write head 50, some phenomenon occurs that the servo write head 50 oscillates, receiving an influence due to oscillations of a motor that runs the magnetic tape MT, from a floor of a workplace, and the like. In the conventional servo writer, because the support arm 52 is designed to be a one-side support structure, there is a problem that the oscillations are easy to transmit to the servo write head 50, it oscillates in lateral directions (X directions in FIG. 6) of the magnetic tape MT, and thus an accurate recording is difficult to be performed. In addition, there is similarly a problem that an accurate reproducing is also difficult to be performed in reproduction.

As a countermeasure for reducing the oscillations of the servo write head 50 and the like, it can be thought to make the support arm 52 a both-side support structure, but if thus configured, there occurs an inconvenience that the position adjustment of the servo write head 50 cannot be originally performed by the position adjustment means since the free end 52a of the support arm 52 is fixed at the base portion 51. Therefore, the both-side support structure cannot be adopted.

Consequently, it is strongly requested to provide a head support structure that can optimize a relative positional relationship between a magnetic tape and a head and achieve an improvement of qualities in recording/reproducing servo signals.

SUMMARY OF THE INVENTION

A head support structure related to a first aspect of the present invention to solve the problems described above is the head support structure for recording/reproducing servo signals on a magnetic tape, comprises a head portion and a support arm, which is one-side supported at the base portion and provides a head provided position-adjustably at a free end for the magnetic tape, and provides a support portion for supporting the free end of the support arm for the base portion.

In accordance with the first aspect of the present invention, because the support arm is one-side supported at the base portion, a position adjustment of the free end of the support arm can be performed, and thereby a position adjustment of the head can be performed for the magnetic tape. Because the support portion is designed to support the free end of the support arm for the base portion, the free end of the support arm is held at the base portion through the support portion, and resultingly, oscillations at the free end of the support arm is suppressed.

Accordingly, the position adjustment of the head for the magnetic tape is ensured and a support for the base portion at the free end of the support arm becomes realized, whereby the position adjustment and oscillation suppression of the head can be simultaneously realized.

In such the head support structure the position adjustment of the head can be performed, for example, at the side of the servo write head as follows:

Firstly, perform the position adjustment of the support arm so that servo signals are accurately recorded for the magnetic tape, and perform a position adjustment so that the position of the servo write head for the magnetic tape becomes an optimal position. After then, further perform the position adjustment of the support arm, and make the position of the servo write head for the magnetic tape deviate to the side of the base portion.

Then make the support portion intervene at the free end of the support arm, and return the free end of the support arm deviated to the side of the base portion by the deviation amount to the optimal position of the step before the adjustment of the deviation amount is performed.

Thus the servo write head results in being adjusted to the position optimal for the magnetic tape. Moreover, because the support portion intervenes between the free end and base portion of the support arm in a state of the support portion being pushed in, the free end becomes a state pushed to the base portion through the support portion, and resultingly, the free end of the support arm is held at the base portion.

Accordingly, the oscillations at the free end of the support arm can be suppressed.

In such the head support structure, even if there occurs a phenomenon that the head receives an influence due to running oscillations of the magnetic tape, oscillations from a workplace, and the like and thereby oscillates, the free end of the support arm is difficult to generate a phase displacement due to oscillations of the magnetic tape and the head, and the oscillations of the head become suppressed because the free end of the support arm is held at the base portion through the support portion.

Accordingly, a position displacement of the servo signals is suppressed at minimum in recording/reproduction, and thereby an effect is obtained that the recording/reproducing of highly accurate servo signals can be realized.

A second aspect of the present invention is that in the first aspect of the head support structure the support portion is configured so that an opposing distance between the base portion and the support arm is adjustable.

In accordance with the second aspect of the present invention the opposing distance between the base portion and the support arm can be adjusted by adjusting the support portion, and thereby a head position for a magnetic tape can be adjusted to a more optimal position. Thus an accurate recording/reproduction of servo signals can be more surely performed.

A third aspect of the present invention is that in any of the first and second aspects of the head support structure the support portion is configured of a support member provided from any one of the base portion and the free end of the support arm toward the other.

In accordance with the third aspect of the present invention, because the support portion is configured of the support member provided from any one of the base portion and the free end of the support arm toward the other, the number of components can be lessened and an advantage can be obtained that the free end of the support arm can be surely supported notwithstanding a less number of the components. In addition, rigidity can be heightened according to the less number of the components, and oscillations at the free end of the support arm can be effectively suppressed.

DESCRIPTION OF THE PREFERRED EMBODIMENTS

Figure 1:
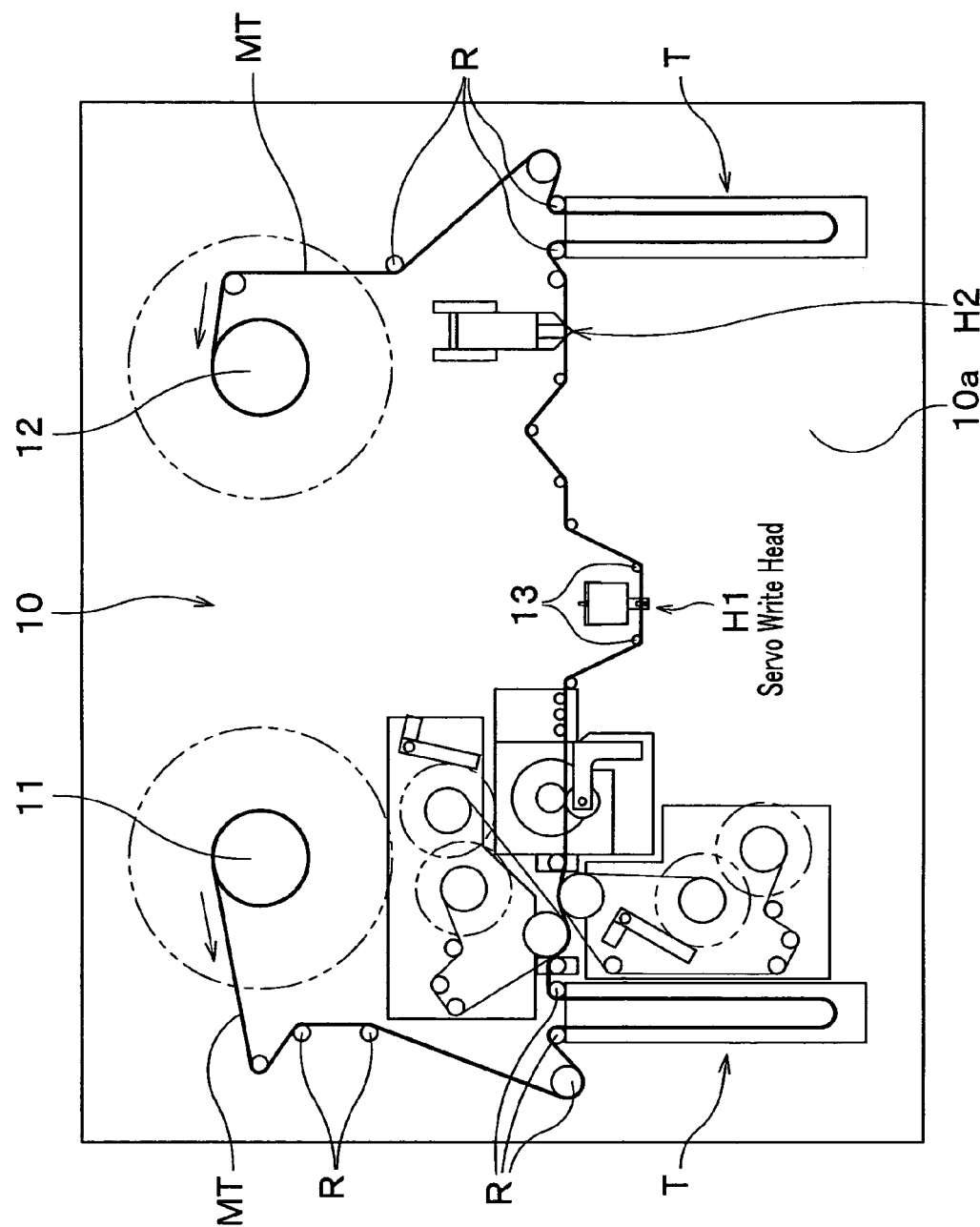
FIG. 1 is a configuration drawing conceptually showing one example of a servo writer for illustrating a head support structure related to an embodiment of the present invention.
Figure 2A:
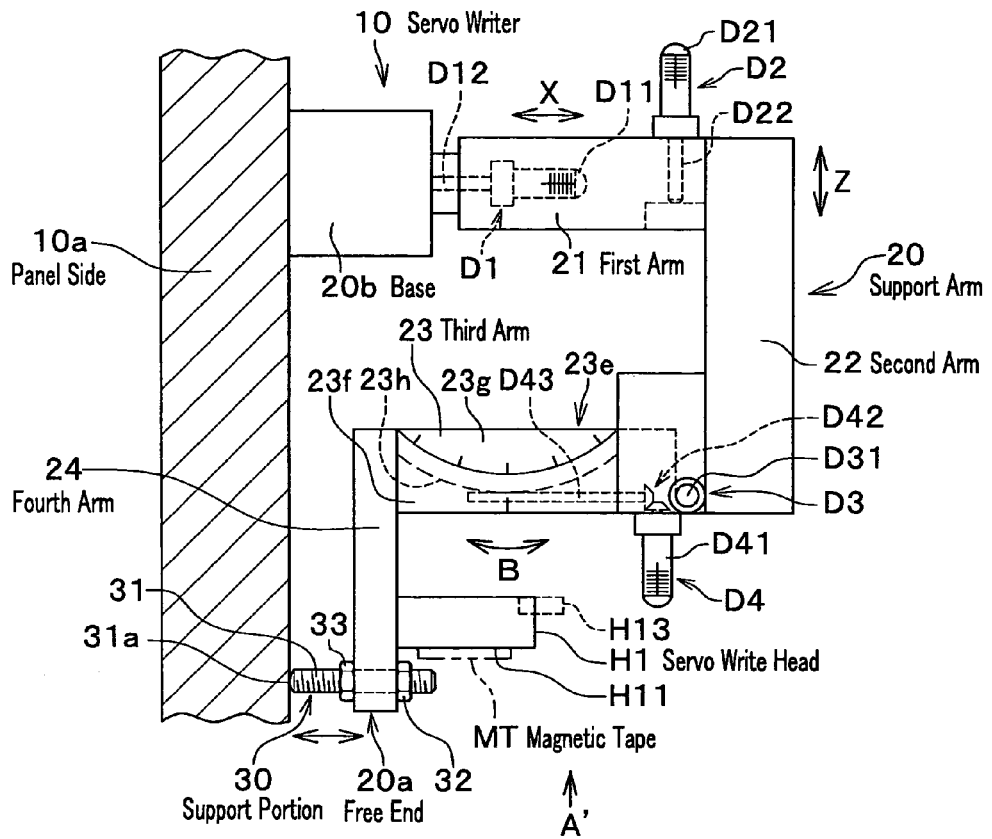
FIG. 2A is a schematic side view showing an overall configuration around a head.
Figure 2B:
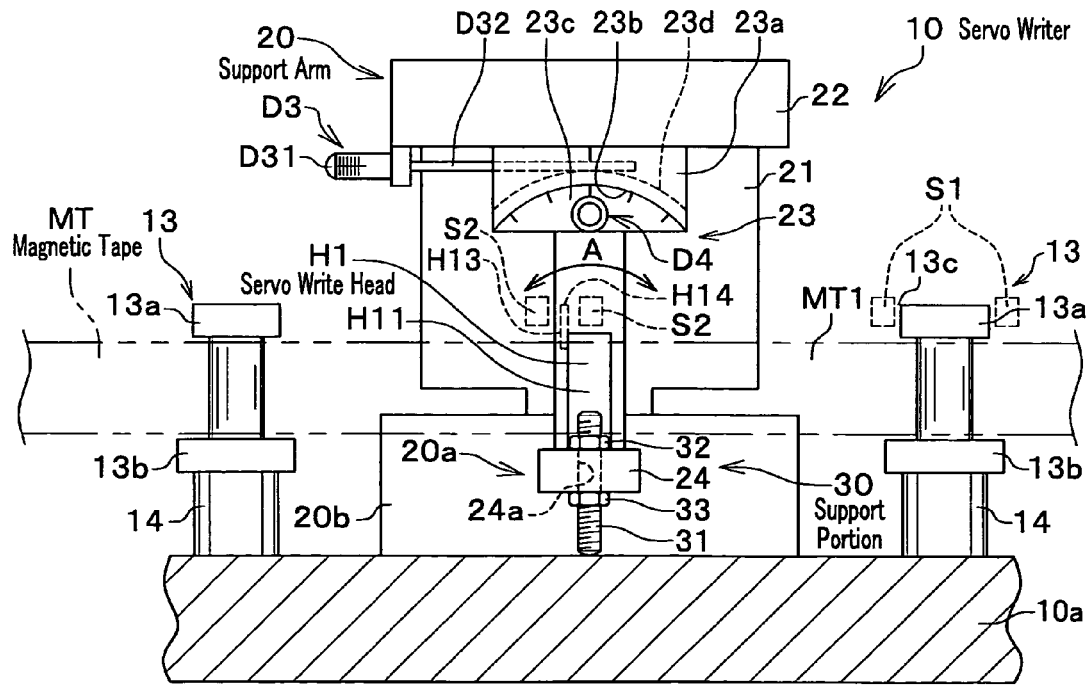
FIG. 2B is a schematic drawing viewed in an arrow mark A' direction in FIG. 2A.

Here will be described a head support structure related to embodiments of the present invention in detail, referring to drawings. FIG. 1 is a configuration drawing conceptually showing one example of a servo writer for illustrating a head support structure related to an embodiment of the present invention. FIG. 2A is a schematic side view showing an overall configuration around a head; FIG. 2B is a schematic drawing viewed in an arrow mark A' direction in FIG. 2A. In addition, in the embodiment a support structure of a servo write head will be described.

At first an overall configuration of a servo writer 10 will be described. The servo writer 10 comprises a supply reel 11 for sending out a magnetic tape MT and a take-up reel 12 for winding the magnetic tape MT from the supply reel 11. At a downstream side of the supply reel 11 and an upstream side of the take-up reel 12 is arranged a servo write head H1 that writes, for example, servo signals with a bottom-open-reverse V-shape servo pattern.

At the downstream side and upstream side of the servo write head H1 are provided tape guides 13, 13 for running the magnetic tape MT along the servo write head H1, respectively. In addition, between the tape guide 13 of the downstream side and the take-up reel 12 is provided a verify head H2 for inspecting the servo signals written by the servo write head H1. Meanwhile, the servo writer 10 comprises various apparatuses such as tape guides R for guiding the magnetic tape MT other than a tension adjustment apparatus (not shown) for adjusting a tension of the magnetic tape MT to a predetermined tension and a tension detection apparatus T.

In such the servo writer 10 the magnetic tape MT sent out from the supply reel 11 is run along a predetermined route by a rotation of capstan rollers while being guided by the tape guides R, passes the servo write head H 1 that performs a recording of the servo signals thereon, then via the verify head H2 that performs a reproducing of the servo signals thereon, and then is wound on the take-up reel 12.

Next will be described a structure and arrangement around the servo write head H1 in detail, referring to FIGS. 2A and 2B. As shown in FIG. 2A, at a reference side (base portion, hereinafter referred to as panel side) 10a is provided a support arm 20 supported at one side, and at a free end 20a of the support arm 20 is provided the servo write head H1. And at the free end 20a of the support arm 20 is provided a support portion 30 for supporting the free end 20a for the panel side 10a.

As shown in FIG. 2B, the tape guides 13, 13 are freely rotatably attached to the panel side (base portion) 10a of the servo writer 10 through the support members 14, 14. At the tape guides 13, 13 are respectively provided flanges 13a, 13b for suppressing the oscillations of the magnetic tape MT in tape lateral directions.

As shown in FIG. 2A, the servo write head H1 comprises a head face H11 for sliding in contact with a recording face of the magnetic tape MT and is designed to record the servo signals on a servo band of the magnetic tape MT by the head face H11.

The servo write head H1 houses a coil wound on a head core not shown and comprises magnetism with a predetermined pattern on the head face H11. And the servo write head H1 is designed so that pulse currents for recording the servo signals are supplied from a servo signal supply circuit not shown through a conducting wire and the like, to magnetize a magnetic layer of the magnetic tape MT by a leak magnetic flux from a magnetic gap, and to write the servo signals for performing position control of a read head of a recording/reproducing apparatus. Meanwhile, the servo signals are written on the not shown servo band provided along a longitudinal direction of the magnetic tape MT.

The support arm 20 comprises a base 20b fixed on the panel side 10a and first to fourth arms 21 to 24 having adjustment mechanisms D1 to D4, and is configured so as to be able to perform the position adjustment of the servo write head H1 for the magnetic tape MT.

The first arm 21 is provided so as to be movable for the panel side 10a in a vertical direction (horizontal directions shown by an arrow mark X in FIG. 2A: lateral directions of the magnetic tape MT), and a movement adjustment thereof is designed to be performed by adjusting the adjustment mechanism D1. The mechanism D1 comprises an adjustment knob D11 and an adjustment screw D12 rotating by a rotation operation of the adjustment knob D11 and is designed so as to move forward/backward in the arrow mark X directions in FIG. 2A, matching a rotation direction of the adjustment screw D12 rotated by a rotation operation of the adjustment knob D12.

The second arm 22 is attached to a top end of the first arm 21, suspended therefrom, and is provided so as to be movable in vertical directions (vertical directions shown by an arrow mark Z in FIG. 2A: thickness directions of the magnetic tape MT) for the first arm 21. A movement adjustment of the second arm 21 comprises an adjustment knob D21 and an adjustment screw D22 rotating by a rotation operation of the adjustment knob D21, and the second arm 22 is designed to move up/down in the arrow mark Z directions in FIG. 2A, matching a rotation direction of the adjustment screw D22 rotated by the rotation operation of the adjustment knob 21.

The third arm 23 is provided at the side of the panel side 10a of a lower end of the second arm 22 and, as shown in FIG. 2B, is configured so that a rotation operation thereof can be performed in azimuth directions (directions shown by an arrow mark A) of the servo write head H1 by the adjustment mechanism D3. The third arm 23 comprises a support member 23a fixed on the second arm 22, and a convex circular arc portion 23c that engages in a concave circular arc portion 23b of the support member 23a and is freely slidable along the circular shape of the concave circular arc portion 23b. At the convex circular arc portion 23c is formed a circular arc worm wheel 23d protruding into the side of the concave circular arc portion 23b. The adjustment mechanism D3 comprises an adjustment knob 31, and a worm gear D32 that rotates by a rotation operation of the adjustment knob 31 and engages with the worm wheel 23d. Thus, performing the rotation operation of the adjustment knob D31, the convex circular arc portion 23c performs an arc movement with matching a rotation direction thereof, and the rotation adjustment of the azimuth directions of the servo write head H1 is performed.

The fourth arm 24 is suspendedly provided at the side of the panel side 10a of an end of the third arm 23, and as shown in FIG. 2A, the servo write head H1 is provided at a side of a human side (opposite side of the panel side 10a) of a lower portion that is the free end 20a of the support arm 20. The fourth arm 24 is rotatably provided in directions for a face of the tape MT (directions shown by an arrow mark B in FIG. 2A) of the servo write head H1 by the adjustment mechanism D4 provided at the third arm 23. The fourth arm 24 is fixed for a convex circular arc portion 23g that engages in a concave circular arc 23f provided at a joining portion 23e of the third arm 23. At the convex circular arc portion 23g is formed a circular arc worm wheel 23h protruding into the side of the concave circular arc portion 23f. The adjustment mechanism D4 comprises an adjustment knob 41, a bevel gear mechanism D42 that rotates by a rotation operation of the adjustment knob 41, and a worm gear D43 that rotates through the bevel gear mechanism D42 and engages with the worm wheel 23h. Thus, performing the rotation operation of the adjustment knob D41, the convex circular arc portion 23g performs an arc movement with matching a rotation direction of the knob D41, and the rotation adjustment of the directions (for a face of the tape MT) of the servo write head H1 is performed.

At a lower portion (free end 20a) of the fourth arm 24 is provided a support portion 30. The portion 30 comprises a support bolt 31, an adjustment nut 32, and a lock nut 33, and these members are formed of a material that is hard and does not influence on the writing of the servo signals by the servo write head H1, for example, a ceramic and the like.

The support bolt 31 is inserted through a screw hole 24a formed at the free end 20a of the support arm 20 and is attached to the free end 20a by being fixed with the adjustment nut 32 and the lock nut 33. A top end 31a of the support bolt 31 is formed like a spherical face and thus designed to make a point contact with the panel side 10a. Thus the contact with the panel side 10a of the support bolt 31 is made not to influence an inclination (inclination due to adjustments of an azimuth angle and/or an angle (made by a face of the tape MT with the head H1)) of the servo write head H1. Meanwhile, an abutting face portion of the panel side 10a may be formed of a hard material like a ceramic. A protrusion amount of the support bolt 31 to the panel side 10a can be performed by rotating the adjustment nut 32 and the lock nut 33. Thus an opposing distance between the panel side 10a and the free end 20a can be adjusted to a desired one.

The support bolt 31 of the support portion 30 is fixed in a state that the top end 31a basically abuts with the panel side 10a and preferably, as described later, is adjusted so as to abut with the panel side 10a with a certain extent of pushing force.

In such the head support structure the position adjustment of the servo write head H1 can be performed, for example, as follows:

Firstly, perform the position adjustment of the first to fourth arms 21 to 24, using the adjustment mechanisms D1 to D4 of the support arm 20, and perform the adjustment so that the servo write head H1 becomes an accurate position for the magnetic tape MT. In this case, make a state that the support bolt 31 of the support portion 30 does not abut with the panel side 10a, and then perform the adjustment. In the adjustment of the support arm 20 it is desirable to repeat tests so that the servo signals are accurately written by the servo write head H1, and preferably, in such the adjustment the accurate position of the servo write head H1 is intended to be found out.

After the adjustment of the support arm 20, performing the rotation operation of the adjustment knob D11 of the first adjustment mechanism D1, perform an extra movement adjustment for the first arm 21 in a direction nearing the panel side 10a. Here, for example, move the first arm 21 by 150 microns in a direction nearing the panel side 10a.

After then, abut the support bolt 31 of the support portion 30 with the panel side 10a, perform the rotation adjustment of the adjustment nut 32, and from this state, protrude the support bolt 31 by 150 microns to the side of the panel side 10a. And fasten the lock nut 33 and fix the support bolt 31.

Thus the free end 20a of the support arm 20 becomes held in the state of being pushed toward the panel side 10a through the support bolt 31 of the support portion 30. In this case, because the movement amount of the support arm 20 where the extra movement adjustment is performed in advance is returned to an original amount by the adjustment of the support bolt 31 of the support portion 30, the accurate position of the servo write head H1 for the magnetic tape MT can be ensured.

Figure 3:
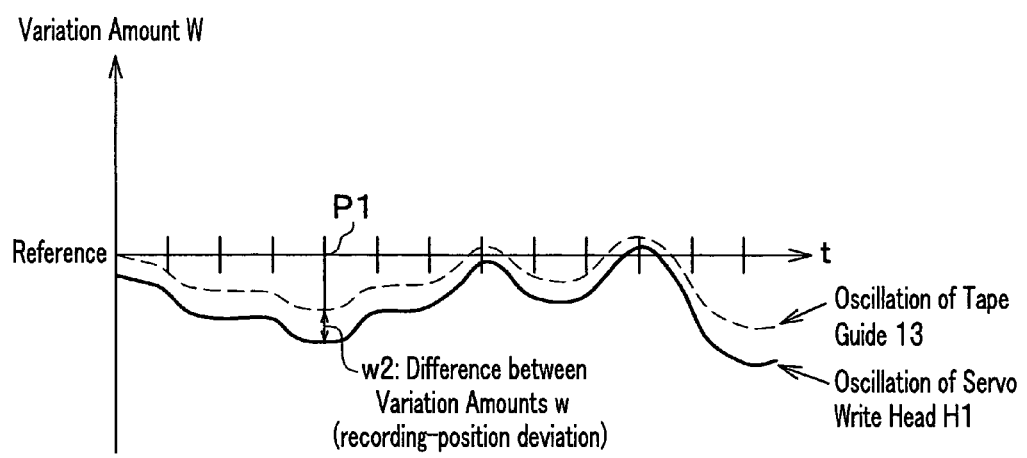
FIG. 3 is a graph showing an effect of an oscillation suppression when using a head support structure of the embodiment.

FIG. 3 is a graph showing an effect of an oscillation suppression when using a head support structure of the embodiment. In the graph shown in FIG. 3, a vertical axis is a variation amount W, and a horizontal axis is a time t.

As a measurement method, as shown in FIG. 2B, two sensors S1, S2 are used: the sensor S1 is placed in the vicinity of an upper edge 13c of the tape guide 13 and measures a position of the upper edge 13c; the sensor S2 is placed in the vicinity of a side of a measurement plate H13 attached to an upper portion 12 of the servo write head H1 and measures a position of an upper edge H14 of the measurement plate H13.

Each of the sensors S1, S2 is configured of two of a light emission portion and a light receiving portion and is arranged so as to pinch relevant one of the upper edge 13c of the tape guide 13 and the upper edge H14 of the measurement plate H13. In the sensor S1 lights from the light emission portion passes above the upper edge 13c of the tape guide 13 and reaches the opposing light receiving portion. Accordingly, a light amount reaching the light receiving portion varies according to the position of the upper edge 13c. In addition, in the sensor S2 lights from the light emission portion passes above the upper edge H14 of the measurement plate H13 and reaches the opposing light receiving portion. Accordingly, a light amount reaching the light receiving portion varies according to the position of the upper edge H14 of the measurement plate H13. Thus by measuring what extent the light amount varies from a reference state can be measured a variation amount w due to oscillations of the tape guide 13 (magnetic tape MT) and the servo write head H1.

In FIG. 3, for example, if the position of the servo write head H1 lowers due to oscillations, a light amount detected increases; on the contrary, if the position of the servo write head H1 rises due to the oscillations, the light amount detected decreases. Thus for a reference position (state where the servo write head H1 is located at an optimal position for the magnetic tape MT), a relative position of the servo write head H1 in writing servo signals can be detected. This is also same for the tape guide 13.

Figure 4:
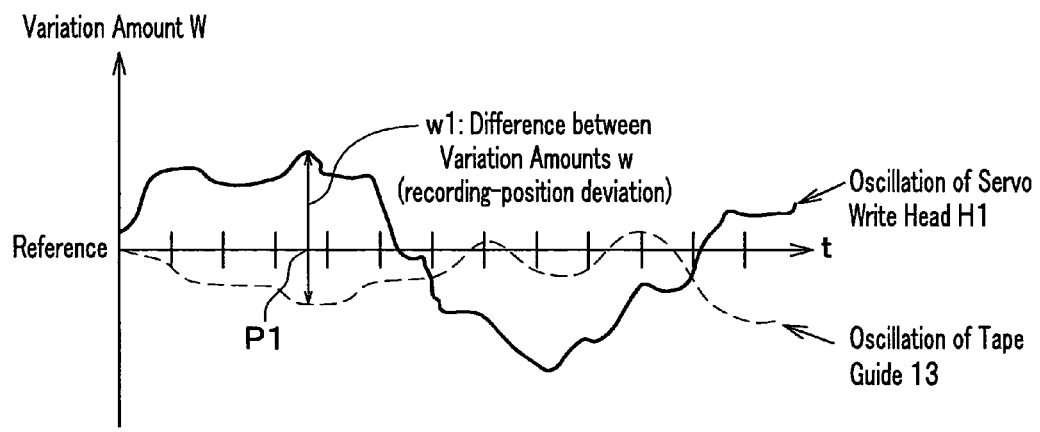
FIG. 4 is a graph showing an oscillation in a head support structure not provided with a support portion.

As a comparison example, in FIG. 4 is shown a measurement example in a support structure in a state where the support portion 30 is removed (one-side support as it is). Comparing FIG. 4 with FIG. 3, in the latter representing the embodiment it turns out that the variation amount of the servo write head H1 remarkably becomes small and oscillations are effectively suppressed by the support portion 30. And it is highly important that a phase of the oscillations of the tape guide 13 (magnetic tape MT) and that of the oscillations of the servo write head H1 become same. In other words, in FIG. 4 a phase of an oscillations of the tape guide 13 (magnetic tape MT) and that of an oscillation of the servo write head H1 become a reverse phase state in a measurement point P1, a difference w1 between the variation amounts w becomes maximum according to this influence, and a phenomenon occurs that the recording position of a servo signal largely fluctuates. On the other hand, in FIG. 3 it turns out that: in the measurement point P1 the phase of an oscillation of the tape guide 13 and that of an oscillation of the servo write head H1 become same; a difference w2 between the variation amounts w is reduced to one fourth of the difference w1; and the fluctuation of the recording position of a servo signal is suppressed small.

That is, in accordance with the head support structure of the embodiment, even if the servo write head H1 receives an influence due to the running oscillations of the magnetic tape MT, the oscillations from a workplace, and the like, and a phenomenon occurs that the servo write head H1 oscillates, a phase displacement due to the oscillations of the magnetic tape MT and those of the servo write head H1 is difficult to occur, and resultingly, an effect can be gained that the oscillations are suppressed because the free end 20a of the support arm 20 is held at the panel side 10a through the support portion 30.

Accordingly, the position displacement of the servo signals due to the oscillations in writing is suppressed minimum, and the writing of highly accurate servo signals can be realized.

In accordance with the head support structure of the embodiment thus described, because the support arm 20 is one-side supported at the panel side 10a, the position adjustment of the free end 20a of the support arm 20 can be performed, and that of the servo write head H1 can be performed for the magnetic tape MT. Because the support arm 30 is designed so as to support the free end 20a of the support arm 20 for the panel side 10a, the free end 20a of the support arm 20 becomes held at the panel side 10a through the support portion 30, and resultingly, the oscillations at the free end 20a of the support arm 20 are suppressed.

Accordingly, the position adjustment of the servo write head H1 for the magnetic tape MT is ensured, the support to the panel side 10a at the free end 20a of the support arm 20 becomes realized, and thus the position adjustment and oscillation suppression of the servo write head H1 can be simultaneously realized.

In addition, by adjusting the support bolt 31 of the support portion 30, the opposing distance between the panel side 10a and the free end 20a, and the position of the servo write head H1 for the magnetic tape MT can be adjusted at an optimal position. Thus the accurate writing of the servo signals can be more surely performed.

Furthermore, because the support bolt 31 of the support portion 30 is provided from the free end 20a of the support arm 20 toward the panel side 10a, an advantage can be obtained that the free end 20a of the support arm 20 can be surely supported notwithstanding the less number of the components. In addition, rigidity can be heightened according to the less number of the components, and the oscillations can be effectively suppressed at the free end 20a of the support arm 20.

Figure 5:
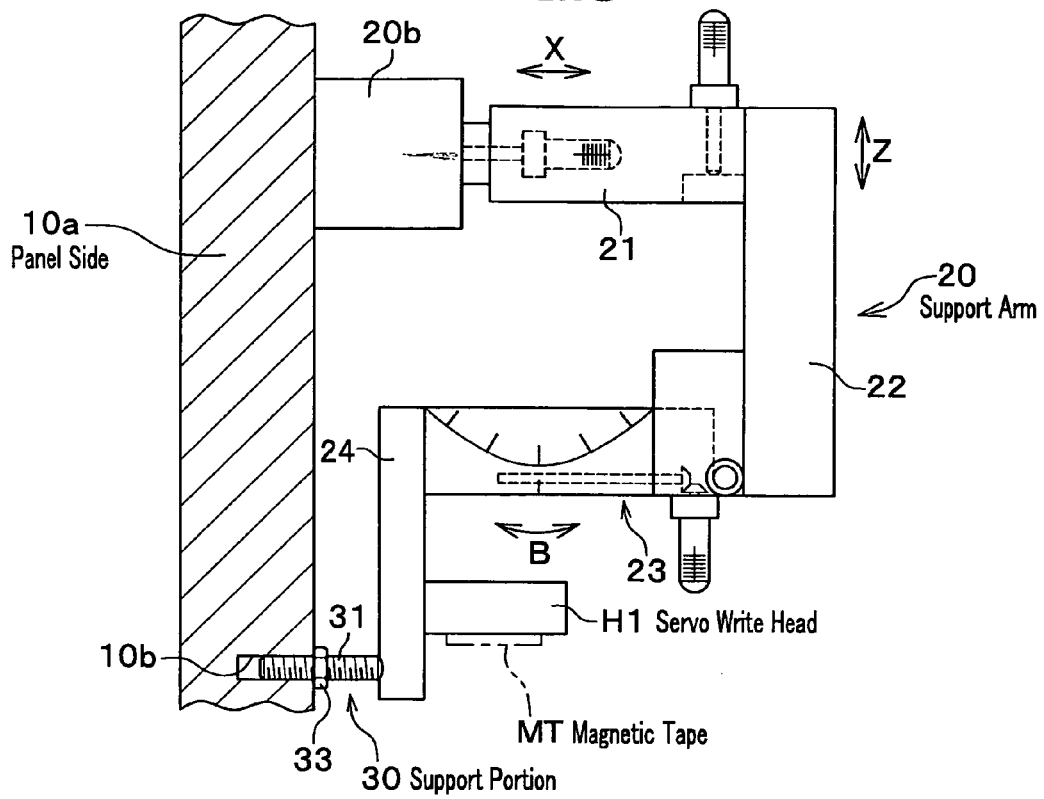
FIG. 5 is a schematic side view showing a variation example.
Figure 6:
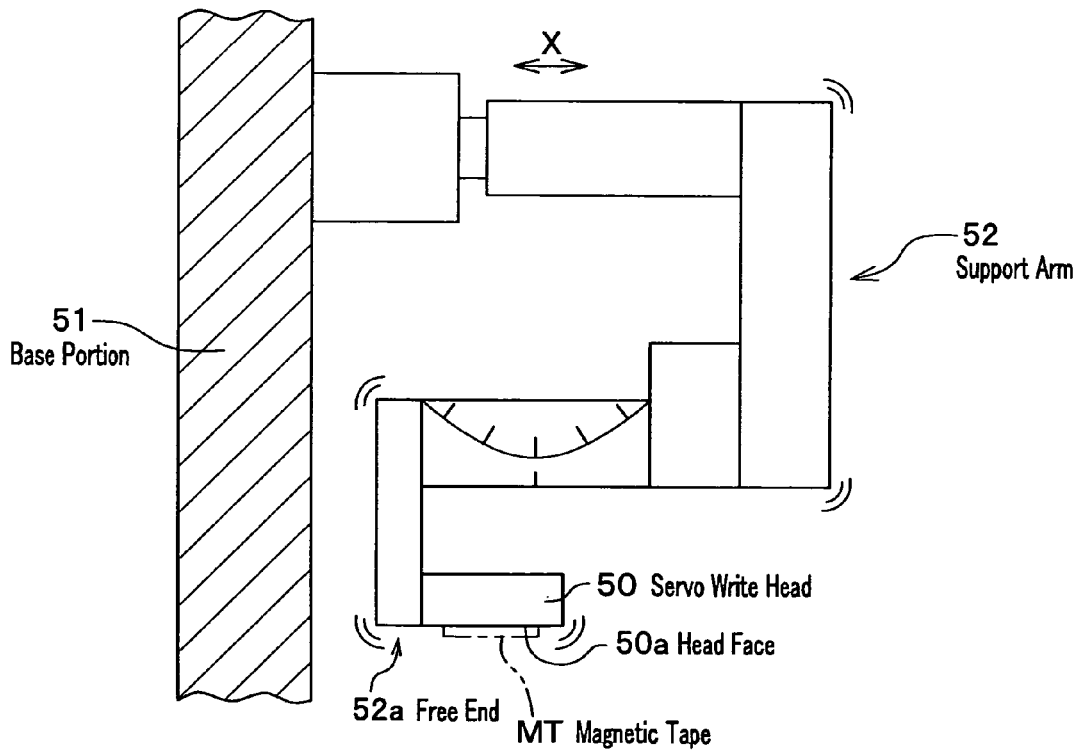
FIG. 6 is a drawing illustrating a conventional technology.

Thus, although the embodiment of the present invention is described, the invention is not limited thereto, and it goes without saying that various variations are available without departing from the spirit and scope of the invention. For example, although in the embodiment the support structure of the servo write head H1 is described, that of the verify head H2 may be made similar. In this case the position adjustment and oscillation suppression can be simultaneously realized, and thus the accurate reproducing of the servo signals can be performed. In addition, as shown in FIG. 5, it is acceptable to be designed so as to screw the support bolt 31 of the support portion 30 in an attachment hole 10b provided at the side of the panel side 10a, adjustably provide the protrusion amount of the support bolt 31, and fix the bolt 31 with the lock nut 33. In this case at the side of the free end 20a a convex portion for engaging the top end of the support bolt 31 may be provided. Furthermore, it is acceptable to be designed so as to provide respective support members from both of the panel end 10a and the free end 20a, and engage and join their top ends each other. In addition, in performing the position adjustment of the servo write head H1 (fro example, a position adjustment of 150 microns), the movement amount of the servo write head H1 may be designed to be detected with utilizing the measurement plate H13 and the sensor S2 used for the detection of the oscillations.

What is claimed is:

1. A head support structure for any of recording and reproducing a servo signal on a magnetic tape, the structure comprising:
   a base portion;
   a support arm fixedly attached to the base portion at one end of said support arm,
   a head directly disposed on one side of a free end of said support arm, so that said support arm supports said head for said magnetic tape; and
   a support portion disposed between the free end of the support arm and the base portion, for adjustably supporting the free end of said support arm at said base portion, wherein said support portion is disposed at an opposite side of the one side of the free end of said support arm.

2. A head support structure according to claim 1, wherein said support portion is configured so that an opposing distance between said base portion and said support arm is adjustable.

3. A head support structure according to claim 2, wherein said support portion is configured of a support member provided from said base portion toward said free end of said support arm.

4. A head support structure according to claim 3, wherein a top end for abutting said free end of said support arm of said support portion is formed like a spherical face.

5. A head support structure according to claim 2, wherein said support portion is configured of a support member provided from said free end of said support arm toward said base portion.

6. A head support structure according to claim 5, wherein a top end for abutting said base portion of said support portion is formed like a spherical face.

7. A head support structure according to claim 1, wherein said support portion is configured of a support member provided from said base portion toward said free end of said support arm.

8. A head support structure according to claim 7, wherein a top end for abutting said free end of said support arm of said support portion is formed like a spherical face.

9. A head support structure according to claim 1, wherein said support portion is configured of a support member provided from said free end of said support arm toward said base portion.

10. A head support structure according to claim 9, wherein a top end for abutting said base portion of said support portion is formed like a spherical face.

11. A head support structure according to claim 1, wherein:
   said support arm includes a first arm attached to said base at a first end of said first arm, a second arm attached to a second end of the first arm, a third arm attached to the second arm, and a fourth arm suspendedly provided at an end of the third arm, said fourth arm constituting said free end of said support arm;
   the head is disposed on the fourth arm; and the support portion is provided at the fourth arm.

12. A head support structure according to claim 1, wherein said support portion comprises a support bolt, an adjustment nut and a lock nut, and a top end of said support bolt is formed with a spherical face, wherein said spherical face abuts one of said support portion and said base to provide a pushing force therewith.

13. A head support structure according to claim 1, wherein the servo signal is a magnetic recording servo signal.

14. A head support structure according to claim 1, wherein said support portion is provided at a portion of said support arm where the head is directly fixed.

15. A position adjustment method of a head support structure for any of recording and reproducing a servo signal on a magnetic tape, wherein the structure has a base portion, a support arm fixedly attached to the base portion at one end of said support arm, a head directly disposed on one side of a free end of said support arm, so that said support arm supports said head for the magnetic tape, and a support portion for adjustably supporting the free end of the support arm at the base portion, wherein said support portion is disposed at an opposite side of the one side of the free end of said support arm comprising:
   performing a position adjustment of said support arm so that a position of a servo write head becomes optimal for said magnetic tape;
   deviating the position of said servo write head for said magnetic tape to a side of said base portion by a predetermined amount by performing the position adjustment of said support arm; and
   moving said support arm to a reverse side of said base portion by adjusting said support portion provided at said base portion so that the position of the servo write head becomes optimal for said magnetic tape.

16. A position adjustment method of a head support structure according to claim 15, wherein said support portion is configured so that an opposing distance between the base portion and the support arm is adjustable.

17. A position adjustment method of a head support structure according to claim 16, wherein said support portion is configured of a support member provided from said base portion toward a free end of said support arm.

18. A position adjustment method of a head support structure according to claim 17, wherein a top end for abutting a free end of said support arm of said support portion is formed like a spherical face.

19. A position adjustment method of a head support structure according to claim 16, wherein said support portion is configured of a support member provided from a free end of said support arm toward said base portion.

20. A position adjustment method of a head support structure according to claim 19, wherein a top end for abutting said base portion of said support portion is formed like a spherical face.

21. A position adjustment method of a head support structure according to claim 15, wherein said support portion is configured of a support member provided from said base portion toward a free end of said support arm.

22. A position adjustment method of a head support structure according to claim 21, wherein a top end for abutting a free end of said support arm of said support portion is formed like a spherical face.

23. A position adjustment method of a head support structure according to claim 15, wherein said support portion is configured of a support member provided from a free end of said support arm toward said base portion.

24. A position adjustment method of a head support structure according to claim 23, wherein a top end for abutting said base portion of said support portion is formed like a spherical face.

25. A position adjustment method of a head support structure according to claim 15, wherein the servo signal is a magnetic recording servo signal.

26. A position adjustment method of a head support structure according to claim 15, wherein said support portion is provided at a portion of said support arm where the head is directly fixed.

* * * * *